US006131064A

United States Patent [19]

Vieweg

[11] Patent Number: 6,131,064

[45] Date of Patent: *Oct. 10, 2000

[54] VEHICLE-AUTONOMOUS DETECTION OF TRAFFIC BACKUP

[75] Inventor: Stefan Vieweg, Düsseldorf, Germany

[73] Assignee: Mannesmann Aktiengesellschaft, Düsseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/794,806

[22] Filed: Feb. 4, 1997

[30] Foreign Application Priority Data

Feb. 6, 1996 [DE] Germany ........................... 196 06 258

[51] Int. Cl.$^{7}$ ........................................ G06F 17/00

[52] U.S. Cl. ......................... 701/117; 701/118; 701/119; 340/905

[58] Field of Search .................................... 701/117, 118, 701/204, 119, 120; 706/900, 205, 913; 340/933, 934, 919, 995, 905, 937

[56] References Cited

U.S. PATENT DOCUMENTS

| | | | |
|---|---|---|---|
| 5,566,072 | 10/1996 | Momose et al. | 364/436 |
| 5,589,827 | 12/1996 | Scurati | 340/901 |
| 5,646,853 | 7/1997 | Takahashi et al. | 364/436 |
| 5,699,056 | 12/1997 | Yoshida | 340/905 |
| 5,745,865 | 4/1998 | Rostoker et al. | 701/117 |

FOREIGN PATENT DOCUMENTS

| | | |
|---|---|---|
| WO 95/14292 | 5/1995 | WIPO . |
| WO 95/25321 | 9/1995 | WIPO . |

OTHER PUBLICATIONS

Lotfi A. Zadeh; The Calculus of Fuzzy IF/Then Rules; pp. 84–94.

Proceedings of the Vehicular Technology Conference Article entitled "Monitoring A Metropolitan Freeway System Using Probe Vehicles and Random Access Radio Channel" written by Jean–Paul M.G. Linnartz, et al., publication date Jun. 8, 1994, pp 410–414.

Proceedings of the Vehicular Technology Conference Article entiled "Traffic Prediction Method by Fuzzy Logic" written by T. Iokibe, et al., publication date Mar. 28, 1993, pp 673–678.

*Primary Examiner*—William A. Cuchlinski, Jr.
*Assistant Examiner*—Arthur D. Donnelly
*Attorney, Agent, or Firm*—Cohen, Pontani, Lieberman & Pavane

[57] ABSTRACT

A process for automated vehicle-autonomous detection of a particular traffic situation by continuously detecting an instantaneous vehicle speed onboard a vehicle. The detected vehicle speeds are classified using guidelines which may be based on rigid values or on fuzzy logic relationships, into one or more of a plurality of traffic categories by assigning a weight for that detected vehicle speed to each of the traffic categories. Thereafter, for each traffic category the weights associated with the detected speed values are integrated over time to calculate an integrated result for each traffic category. The integrated results of the traffic categories are then evaluated based on predetermined rules or criteria to generate a probabilistically-based traffic detection value indicating the traffic category representing the vehicles' current traffic situation. The traffic categories and guidelines or membership functions or relationships are defined for use with a particular type of road.

10 Claims, 2 Drawing Sheets

VEHICLE-AUTONOMOUS DETECTION OF TRAFFIC BACKUP

BACKGROUND OF THE INVENTION

1. Field of the Invention

The present invention is directed to a process and apparatus for automated vehicle-autonomous detection and identification of a traffic condition or situation, and in particular to the automated detection and identification of backed-up traffic or traffic jams. In addition, the invention defines a set of criteria or rules for automatically determining the navigability of streets based on the determined traffic flow.

2. Description of the Related Art

An essential task in the field of transport telematics is to determine and describe the traffic situation with the aim of correcting and preventing traffic backup situations as far as possible by foresighted diversion of road users to less crowded routes. To accomplish this purpose it is known to use detection devices, as for example beacons, induction loops or the like, that are installed in a stationary manner with respect to the road. These stationary detection devices not only incur very high costs in order to provide and maintain the necessary infrastructure, but also are disadvantageous in that they have an extremely narrowly defined useful local range for reasons inherent in the system. Therefore, it is necessary to install a multitude of such detection devices in order to determine the traffic situation over a wide area of interest.

Recently, devices have been developed that detect traffic situations without the use of stationary devices by transmitting appropriate information from vehicles, otherwise known as "floating probes", to suitable data collecting stations such as central traffic control offices. In particular, these non-stationary devices include measurement stations floating or traveling along with the traffic i.e. "floating probes" which transmit relevant data, notably vehicle speed, using a mobile wireless communications device such as a radio telephone to respective data collection points or stations for further processing and evaluation. The information is evaluated at the collecting station and the results may be transmitted to a large number of road travellers as traffic guidance and recommended detours so that the traveller may select the best possible route based on the traffic situation. The results may also serve as input for automatic route guidance and navigation systems.

A problem with such "floating probes" is that the continuous transmission of the current speed of a plurality of vehicles often times imposes an extraordinarily heavy burden on the transmission channels of the communications device in addition to a significant expense when using a toll communications system. These problems must be considered in light of the fact that a substantial amount of the transmitted information does not actually provide different or changing information. Therefore, it would be advantageous to limit the transmission of information, at least for the most part, to instances in which critical traffic situations occur, have already occurred or recur. To limit the information transmitted in such manner would require a determination of the time periods during which significant changes in road traffic in terms of traffic management occur. Using conventional floating probes, the information may be transmitted under the control of individuals in or among the floating probes, so-called "traffic jam reporters", as needed depending on the relevant traffic situation. However, this is disadvantageous in that it not only requires a corresponding willingness on the part of the reporters, but is also subject to deliberate or unwitting transmission of incorrectly appraised traffic situation data.

Therefore, it is the object of the present invention to provide a process and device for automated detection of a traffic situation, and in particular of traffic congestion and jams, onboard a vehicle which is independent of reporters or manual interaction.

SUMMARY OF THE INVENTION

The present invention is directed to a device and process for automated vehicle-autonomous detection of a particular traffic situation by continuously detecting an instantaneous vehicle speed onboard a vehicle. The detected vehicle speeds are initially classified in accordance with guidelines, which may be based on predefined values or rules or fuzzy logic statements, into one or more speed or traffic characterizing categories by assigning a weight to each of the detected vehicle speeds. Thereafter, for each speed category the weights associated with the detected speeds assigned to that category are integrated over time to calculate smoothed or integrated results for each speed category. The integrated results of the speed categories are then evaluated on the basis of predetermined rules or criteria to generate a traffic detection value which is probabilistically indicative of the type of traffic condition present on the road. The traffic categories and guidelines or membership functions or relationships are defined for use with a particular type of road.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
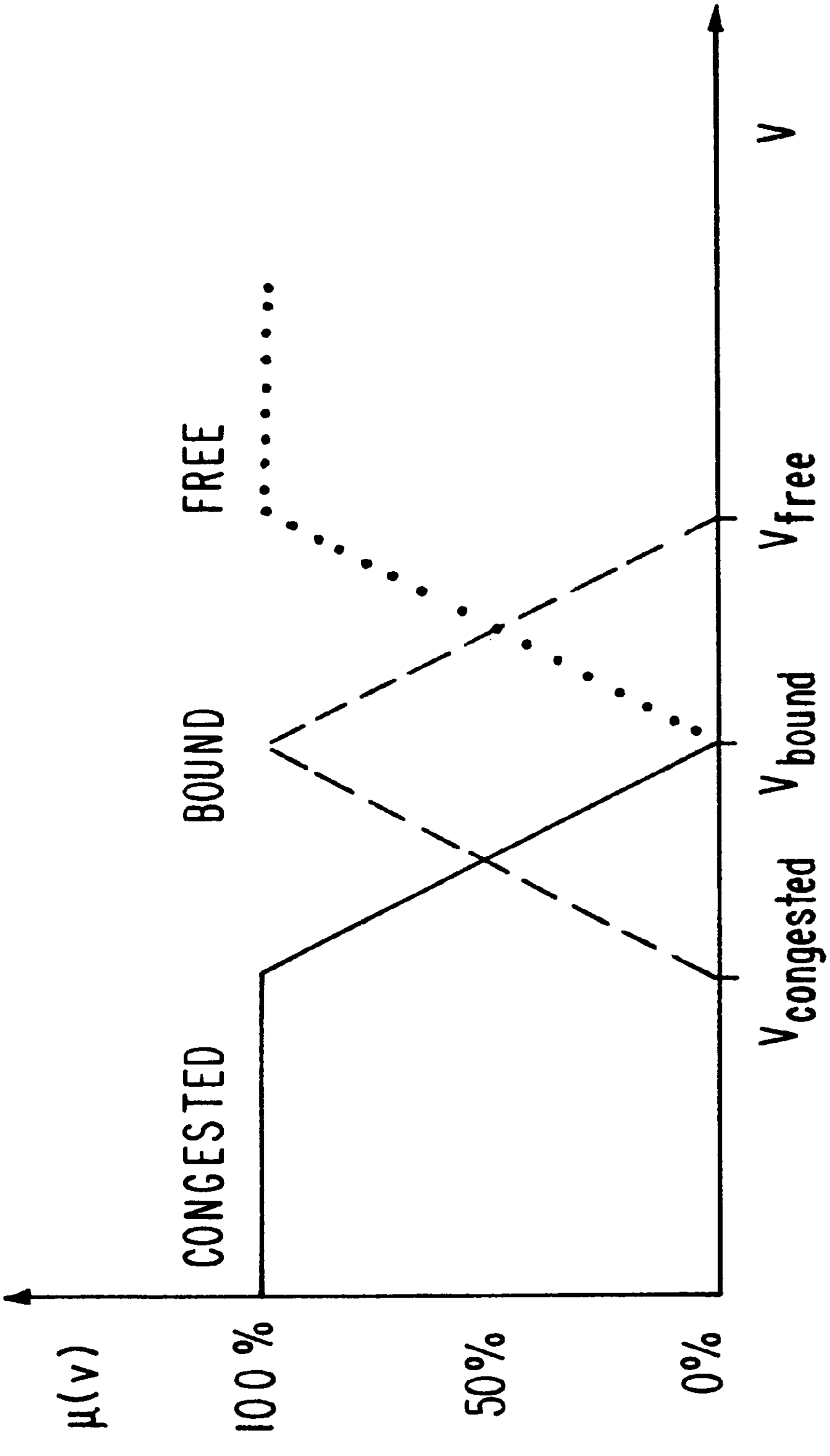
FIG. 1 is an example graphical representation of speed as a function of weight or grade of membership for three membership functions representing three distinct traffic conditions or classifications into one or more of which the detected vehicle speeds are assigned in accordance with the present invention.
Figure 2:
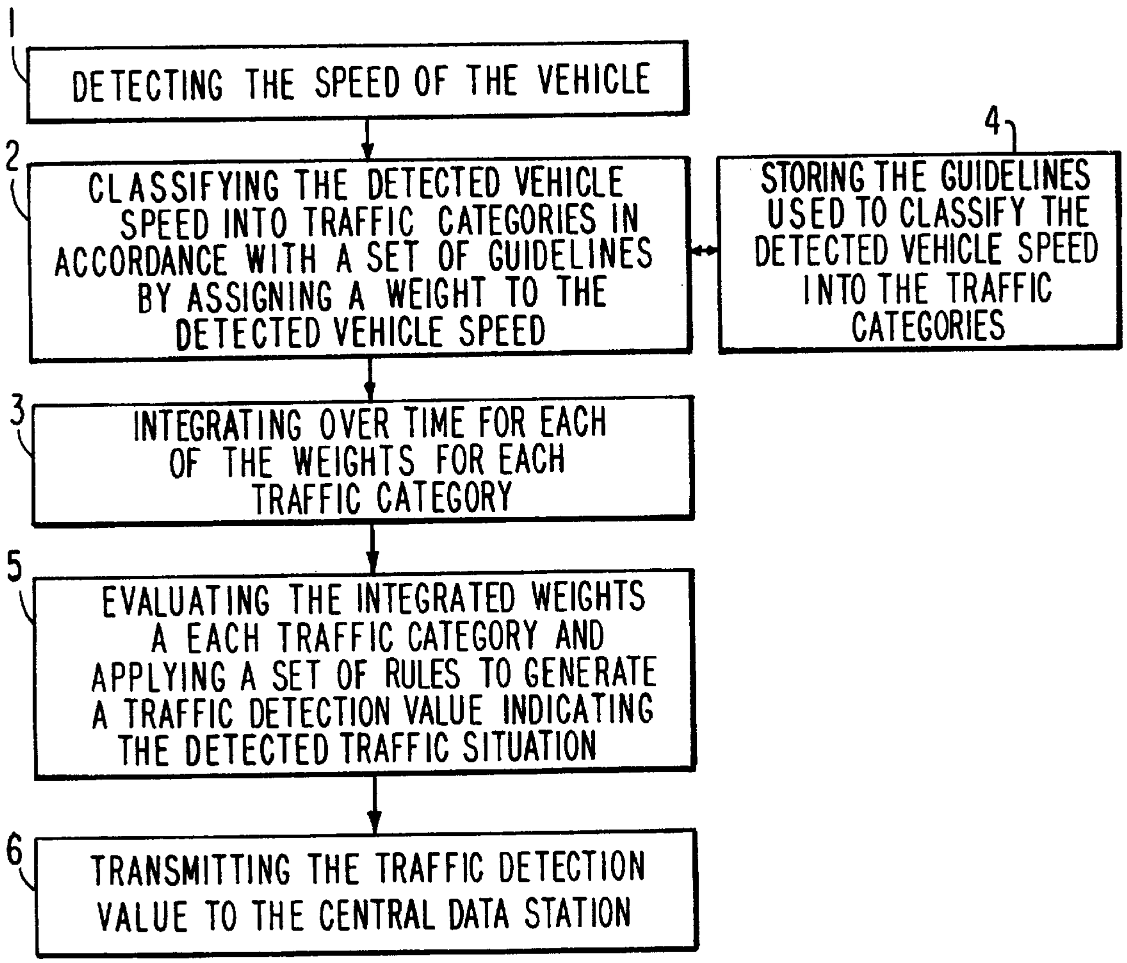
FIG. 2 depicts a flow chart of a system for automatic vehicle-autonomous detection of a traffic situation in accordance with the present invention.

A flow chart of the preferred automated vehicle-autonomous traffic detection and identification process of the present invention is shown in FIG. 2. Initially, in block 1 the speed of the vehicle is continuously and instantaneously detected and output onboard the vehicle using any suitable type of known speed detection device. Detected vehicle speed data is then transmitted to a classifying device, such as a general purpose data processing device or computer known and used by those of ordinary skill in the art, as shown in block 2. The classifying device assigns, as hereinafter described, each detected vehicle speed into one or more respective traffic categories or classifications as defined by predetermined guidelines that are preferably based on the type of road on which the detecting vehicle is traveling. FIG. 1 thus shows weight or grade of membership as a function of vehicle speed in an example set of membership functions A, for illustrative purposes only, used as guidelines for assigning each detected vehicle speed to one or more of three traffic categories or classifications. Although three traffic categories or classifications are shown by way of example in FIG. 1, it should be understood that any number of two or more of such traffic categories may be employed within the scope and contemplation of the invention.

In the example shown in FIG. 1, the three traffic categories are labeled "congested", "bound" and "free". The "congested" category represents a low speed traffic situation in which the vehicle is generally not moving or is in stop-and-go traffic such as is commonly found in backed-up or heavily congested traffic jams. The "bound" category represents a mid-speed traffic situation in which the vehicle is moving but the speed of the vehicle is limited by the traffic around it, thereby restricting the amount by which the vehicle speed may vary relative to the surrounding vehicles. The "free" category represents a freeflowing, typically high-speed traffic situation in which the speed of the vehicle may be selectively varied without regard to the speed of other vehicles. These categories and definitions have been selected and are being described merely for illustrative purposes, and may be modified as desired to represent any type of traffic situation.

The three membership functions or relationships that are used to define the "congested", "bound" and "free" traffic categories are respectively denoted in FIG. 1 by the solid, dashed and dotted lines. These membership functions or guidelines or relationships are preferably stored in a data storage device 4 and are retrieved or accessed by the classifying device. Storage device 4 is preferably a non-volatile storage device, whereas speed data may be stored in a volatile storage device, preferably organized as a ring buffer. The membership functions or guideline values may either be fixed or stored as dynamically changing variables; for example, the membership functions may be set or specified when the device is turned on during an initialization sequence. In an alternative embodiment or modification, the membership functions or guidelines may be changed, as needed, remotely from a central location, as for example by a mobile radiotelephone or even in an autonomous manner using predefined guidelines associated to different classes of street like urban or rural roads, highways etc. The example membership functions shown in FIG. 1 are based on fuzzy logic statements that take into account the overlapping nature of the traffic categories; thus, a particular detected speed may be indicative, for example, of congested or bound traffic. While such "fuzzy" guidelines are preferred, relationships which vary with speed into a single traffic classification with invarying regularity are also within the intended scope of the invention. The membership functions or relationships are preferably determined based on the type of road. For instance, a set of appropriate membership functions or guidelines may be selected from different membership functions or guidelines or sets thereof developed for each road type, as for example highways and city streets. In this regard, a lower speed range may be divided into individual categories in order to accurately identify traffic patterns and flow in city streets and the middle and upper speed ranges may be appropriately divided into individual categories to identify traffic situations on highways. The detection system of the present invention is thus capable of distinguishing between stop-and-go congestion caused by high traffic volume and similar "normal" driving behavior when the vehicle is merely stopped at a red light. As a result, the accuracy of identifying a particular traffic situation is improved. Information concerning the type of road condition may be determined manually or automatically and transmitted along with the detected vehicle speed. The transmission of additional information, as for example information concerning the degree of revolution of the vehicle front wheels or of the steering-wheel, may also be detected and transmitted to the data processing device or data collection point for use in identifying the type of road and road condition and, in turn, in selecting an appropriate set of membership functions or guidelines to be applied.

Once a particular set of membership functions have been selected for use, as for example those represented in FIG. 1, the detected vehicle speeds are classified in block 2 into one or more of the respective traffic categories by assigning to each detected vehicle speed a weight or grade of membership value for each traffic category. Thus, and referring by way of example to the membership functions depicted in FIG. 1, classification for category assignment of the detected vehicle speeds results in one of five possible situations. In a first situation, the detected vehicle speed is between the values 0 and $V_{congested}$ and the "congested", "bound" and "free" classifications are assigned for this detected speed data point respective grades of membership values 100%, 0%, 0%. Similarly, in a second situation, the detected vehicle speed value is $V_{free}$ or greater and the "congested", "bound" and "free" classifications are assigned for this detected speed data point respective grades of membership values 0%, 0%, 100%. The third situation is limited to the situation in which the detected vehicle speed is equal to $V_{bound}$ and the "congested", "bound" and "free" classifications are assigned respective grades of membership values 0%, 100%, 0%. In the fourth and fifth situations, in which the detected vehicle speed is between $V_{congested}$ and $V_{bound}$ or between $V_{bound}$ and $V_{free}$, the boundaries are not rigid, i.e. the detected vehicle speed is not classified as being 100% in any one category. For instance, if the detected speed value lies midway between $V_{congested}$ and $V_{bound}$, then the "congested", "bound" and "free" classification will be assigned respective grades of membership values 50%, 50%, 0%. Thus, every detected vehicle speed is assigned a corresponding weight or grade of membership value in each the traffic categories "congested", "bound" and "free".

After the detected vehicle speed has been classified and an appropriate grade of membership value has been assigned to each traffic category, in block 3 the grade of membership values of each speed category for each detected vehicle speed is integrated over a predetermined period of time and an integrated result is produced for each speed category. The integration here is to smooth the data and thereby lessen the influence of speed perturbations or anomalies in the successive data points. Those skilled in the art will recognize that integration is but one way of carrying out this function. In block 5 the integrated results of one or more of the traffic categories are evaluated on the basis of predetermined rules or criteria to identify, with a high degree of probability, the type of traffic situation represented by the accumulated vehicle speed data. The rules or criteria employed may be relatively simple, as for example merely determining whether the integrated result of one of the traffic categories falls above or below a predetermined threshold or within a predetermined range. On the other hand, the rules or criteria may take into consideration the integrated results of all three traffic categories to thereby improve the accuracy of identifying the particular type of traffic situation, as for example determining whether the integrated result of each traffic category falls above or below a predetermined threshold or within a predetermined range. Thus, in block 5 the integrated results are evaluated on the basis of the predetermined rules or criteria to produce a traffic detection or measurement value. The traffic measurement is preferably defined on a limited scale, as for example a probability scale, indicating a probability that the traffic situation is in one class or type rather then another. For example, where the evaluation indicates a 0% traffic detection value or probability for the congested category, an 80% probability for the bound category, and a 45% probability for the free category, an evaluation based solely on these values indicates bound traffic. The addition of other criteria to the evaluation may strengthen the indication that the traffic is "bound" or, on the other hand, increase the probability that traffic is actually free flowing based on other available information. Thus, the present invention automatically detects critical traffic situations and potentially critical traffic situations without manual effort.

The method and apparatus of the present invention may also independently activate, optionally as a function of the detected or probabilistically indicative traffic situation, a communications device 6, as for example a wireless transmitter, that transmits information such as the traffic detection value to an appropriate central data location or collection station. The communications device may transmit the traffic detection value, detected vehicle speed and/or any other information obtained or generated by the automated detection device. Information is transmitted by the communications device to the central data station until the detected vehicle speed generated by the automated vehicle-autonomous detection device ceases to produce a substantially new or different traffic detection value over a predetermined period of time, for example when a vehicle is stopped for a predetermined period of time in backed-up or congested traffic, at which point the communications device is deactivated and stops transmitting information to the central data station. During deactivation of the communication device, detection of the vehicle speed and generation of a traffic detection value continues. At some later point in time when the traffic detection value changes, as for example when the vehicle leaves the backed-up or congested traffic, the communication device is automatically reactivated and again begins to transmit information to the central data station. Controlling the communication device in this manner reduces the overall burden or amount of information being transmitted between the vehicle and central data station without affecting the reliability or accuracy of the detection device. In a preferred embodiment, the classifying device 2, storage device 4, integrating device 3, and evaluating device 5 may be constructed in the form of an electronic computing system located onboard the vehicle. In order to allow meaningful evaluation of the traffic flow information that is transmitted to the data collecting station, the transmission may, when appropriate, also include or be supplemented with information on the respective geographical position of the transmitting vehicle. For this purpose, the device of the present invention may additionally include or be associated with a position determining device, as for example a conventional global positioning satellite receiver or other arrangement relying on data transmitted from one or more navigation satellites, as is well known in the art.

The process according to the present invention thus enables an automated decentralized and vehicle-autonomous determination of particular traffic flow situations. The reliability of the data received from a vehicle may be significantly reduced through the use of expert system rules and criteria for assessing the weighting of the detected speed data. The onboard device constructed in accordance with the invention for this purpose may be manufactured relatively simply and economically using standard components. The invention minimizes the amount of data communications required between the floating probe and central location or data collecting station while accurately and reliably detecting and reporting dynamically-changing traffic conditions.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A process for automated vehicle-autonomous detection of a traffic situation, comprising the steps of:

detecting continuously and outputting an instantaneous vehicle speed using a vehicle speed detection device onboard a vehicle;

inputting the detected vehicle speed output from the vehicle speed detection device into an automated data processing device for classifying the detected vehicle speed in the data processing device in accordance with a set of guidelines into a plurality of predetermined traffic categories by assigning to the detected vehicle speed a weight and storing them in each of the traffic categories;

integrating over time in the data processing device for each of the traffic categories the stored weights in each traffic category and generating an integrated result for each traffic category;

evaluating in the data processing device the integrated results of the traffic categories by applying the integrated results to a set of predetermined rules and generating a traffic detection value indicating one of the traffic categories representing the detected traffic situation; and wirelessly transmitting the traffic detection valve to a central location.

2. The detection process of claim 1, wherein the guidelines comprise fuzzy logic rules.

3. The detection process of claim 2, wherein the guidelines comprise a set of traffic category membership functions.

4. The detection process of claim 1, wherein the predetermined traffic categories comprise at least three categories.

5. The detection process of claim 1, wherein the predetermined traffic categories are defined for use with a particular type of road.

6. The detection process of claim 1, wherein said step of evaluating the integrated result of each of the speed categories further comprises mapping the integrated results of the traffic categories to a probability scale.

7. A system for automated vehicle-autonomous detection of traffic situations, comprising:

a vehicle speed detection device located onboard a vehicle for continuously detecting and outputting an instantaneous vehicle speed;

an automated data processing device for receiving and classifying the detected vehicle speed output from said vehicle speed detection device in accordance with a set of guidelines into a plurality of predetermined traffic categories by assigning to the detected vehicle speed and storing a weight in each of the traffic categories, for integrating over time for each of the traffic categories the stored weights in each of the traffic categories, for generating an integrated result for each of the traffic categories, and for evaluating the integrated results of the traffic categories by applying the integrated results to a set of predetermined rules to generate a traffic detection value indicating one of the traffic categories representing the detected traffic situation; and means for transmitting traffic the traffic detection value from the vehicle to a remote data collection station, said transmitting means being connected to said data processing device and being operatively actuatable by said data processing device as a function of the detected traffic situation.

8. The detection device of claim 7, further comprising storage means connected to said data processing device for storing the set of guidelines.

9. The detection device of claim 8, wherein said data processing device and said storage means are located onboard the vehicle.

10. The detection device of claim 7, wherein said transmitting means is activated in response to predetermined changes in the traffic detection value.

* * * * *